(12) United States Patent
Wagner et al.

(10) Patent No.: US 10,385,538 B2
(45) Date of Patent: Aug. 20, 2019

(54) OPERATOR'S CAB ARRANGEMENT FOR A CONSTRUCTION MACHINE

(71) Applicant: Guangxi LiuGong Machinery Co., Ltd., Liuzhou (CN)

(72) Inventors: Edward Wagner, Liuzhou (CN); Li Yanjun, Liuzhou (CN); Zhao Yunfeng, Tianjin (CN); Waldemar Czeslaw Chmielowiec, Stalowa Wola (PL)

(73) Assignee: Guangxi LiuGong Machinery Co., Ltd., Liuzhou, Guangxi (CN)

( * ) Notice: Subject to any disclaimer, the term of this patent is extended or adjusted under 35 U.S.C. 154(b) by 0 days.

(21) Appl. No.: 14/908,085

(22) PCT Filed: Apr. 28, 2015

(86) PCT No.: PCT/CN2015/077689
§ 371 (c)(1),
(2) Date: Jan. 27, 2016

(87) PCT Pub. No.: WO2016/172854
PCT Pub. Date: Nov. 3, 2016

(65) Prior Publication Data
US 2018/0038073 A1    Feb. 8, 2018

(51) Int. Cl.
*E02F 9/08*    (2006.01)
*B62D 33/06*    (2006.01)
(Continued)

(52) U.S. Cl.
CPC ........ *E02F 9/0833* (2013.01); *B62D 33/0617* (2013.01); *E02F 3/7631* (2013.01);
(Continued)

(58) Field of Classification Search
CPC ....... B62D 33/06; B62D 33/0617; E02F 3/76; E02F 3/7609; E02F 3/7631; E02F 9/16; E02F 9/163; E02F 9/0833
(Continued)

(56) References Cited

U.S. PATENT DOCUMENTS 4,416,486 A * 11/1983 McNaught ......... B62D 33/0617
180/89.12
5,125,716 A    6/1992 Smith et al.
(Continued)

FOREIGN PATENT DOCUMENTS

CN    1272157 A    11/2000
CN    101253091 A    8/2008
(Continued)

OTHER PUBLICATIONS

Extended European Search Report; European Patent Application No. 15197569.5-1712, dated Aug. 17, 2016.
(Continued)

*Primary Examiner* — Jason S Daniels
(74) *Attorney, Agent, or Firm* — Young Basile Hanlon & MacFarlane, P.C.

(57) ABSTRACT

An operator's cab arrangement for a construction machine (100) is proposed which comprises side wall elements, a front wall element, a rear wall element and a roof element (4). At least one of said side wall elements is closable by a door element (1) which is pivotably mounted to said arrangement with a pivot axis being substantially vertical with respect to said construction machine (100). Said door element (1) is inclined towards a central axis of said construction machine when closed.

17 Claims, 14 Drawing Sheets

(51) Int. Cl.
  *E02F 3/76* (2006.01)
  *E02F 9/16* (2006.01)

(52) U.S. Cl.
  CPC .............. *E02F 9/0891* (2013.01); *E02F 9/16* (2013.01); *E02F 9/163* (2013.01); *B60Y 2200/411* (2013.01)

(58) Field of Classification Search
  USPC .......................... 296/190.01, 190.08, 190.11
  See application file for complete search history.

(56) References Cited

U.S. PATENT DOCUMENTS

| | | |
|---|---|---|
| 2006/0113121 A1 | 6/2006 | Radke et al. |
| 2007/0046070 A1 | 3/2007 | Hayes et al. |
| 2007/0132277 A1 | 6/2007 | Ishii et al. |
| 2010/0031644 A1 | 2/2010 | Keane et al. |
| 2010/0156144 A1 | 6/2010 | Iwakata et al. |
| 2012/0204589 A1 | 8/2012 | Krellner et al. |
| 2012/0224941 A1 | 9/2012 | Peterson et al. |
| 2013/0000930 A1 | 1/2013 | Shintani et al. |
| 2016/0305091 A1* | 10/2016 | Ikeda ................. B62D 33/0617 |

FOREIGN PATENT DOCUMENTS

| | | |
|---|---|---|
| CN | 201321623 Y | 10/2009 |
| CN | 101687521 A | 3/2010 |
| CN | 2030049667 U | 7/2013 |
| CN | 204282435 U | 4/2015 |
| CN | 106088204 A | 11/2016 |
| EP | 0493774 A1 | 7/1992 |
| EP | 1757738 A1 | 2/2007 |
| EP | 3088612 A1 | 11/2016 |
| JP | 2004268684 A | 9/2004 |
| JP | 2005263024 A | 9/2005 |
| KR | 20100071363 A | 6/2010 |
| WO | 2016172854 A1 | 11/2016 |

OTHER PUBLICATIONS

International Search Report, PCT Application No. PCT/CN2015/077689, dated Feb. 5, 2016, by Authorized Officer Yuxia Zhao.

Written Opinion of the International Searching Authority, PCT Application No. PCT/CN2015/077689, dated Feb. 5, 2016, by Authorized Officer Yuxia Zhao.

European Patent Office; Result of Consultation; Issued in Connection to EP15197569.5; Feb. 13, 2018; 3 pages; Europe.

Chinese First Office Action dated May 2, 2018 in corresponding Application No. 201610194808.7 (English Translation).

* cited by examiner

OPERATOR'S CAB ARRANGEMENT FOR A CONSTRUCTION MACHINE

This application claims the benefit, and priority benefit, of International Patent Application No. PCT/CN2015/077689, filed Apr. 28, 2015, which designated the United States and was entitled "OPERATOR'S CAB ARRANGEMENT FOR A CONSTRUCTION MACHINE," the disclosure and contents of which are incorporated by reference herein in its entirety.

The present invention relates to an operator's cab arrangement for a construction machine. In particular, the present invention relates to an operator's cab arrangement with an improved layout which can be advantageously applied to a construction machine having tracks for driving the construction machine.

TECHNICAL BACKGROUND

Construction machines include those which have a pair of tracks which are drivable by a drive device such as an engine. Such construction machines also include bulldozers which are designed for use for earth moving applications. The use of tracks provides the advantage of an optimum grip while the surface contact of the tracks is improved with respect to other alternatives such as wheels.

Construction machines usually comprise an operator's cab in which an operator of the construction machine can sit while he performs the required operations during the use of the construction machine. Such operator's cabs include at least partially open cabs and closed cabs. Recent developments led to constructions in which the operator's cab is completely closed in order to prevent dust from entering the operator's cab and to allow the option of an efficient air conditioning of the inner space of the operator's cab.

The accessibility of the operator's cab when applied to construction machines is usually a problem. For providing a completely closed operator's cab, a door will be provided which can be opened in order to access the operator's cab. Due to the substantive height of the operator's position in the operator's cab, the operator has to climb up to the level which allows him to enter the operator's cab.

In a particular application in which the construction machine employs a pair of tracks or crawler track chains on both sides, it is widely accepted that the operator steps on the upper area of one of the tracks, opens the door and enters the operators cab. However, this accepted solution is obviously not satisfactory due to the fact that such a course for entering the operator's cab is unacceptable in view of safety requirements. Moreover, such machines usually are used in earth moving applications such that the tracks will be covered by a substantive amount of dirt which results in an unacceptable entry of dirt into the inner space of the operator's cab which should be avoided as much as possible.

SUMMARY OF THE INVENTION

It is the object of the present invention, to provide an improved operator's cab arrangement for a construction machine which allows an improved accessibility for the operator into the inner space of the operator's cab while the above mentioned disadvantages are avoided. The object is solved by an operator's cab arrangement for a construction machine having the features of claim 1. Further advantageous developments of the invention are defined in the dependent claims.

According to an aspect of the present invention, an operator's cab arrangement for a construction machine is provided, the arrangement comprising side wall elements, a front wall element, a rear wall element and a roof element. At least one of the side wall elements is closable by a door element which is pivotably mounted to said arrangement with a pivot axis being substantially vertical. The door element is inclined towards a central axis of said construction machine when closed.

According to the above aspect, the operator's cab arrangement according to the present invention is applicable to a construction machine which comprises a central axis. The central axis is defined as longitudinal axis which is substantially aligned to the longitudinal axis of the construction machine, e.g. the movement direction of the construction machine when the same is moved straight forward. The central axis is preferably defined as axis of symmetry regarding the design of the construction machine.

According to the above concept, the door element is used to close the operator's cab defining the closed position of the door. In the above concept, the door is formed with a main area being a plane while round or otherwise deviating shapes in certain areas of the door are not excluded by such a definition.

According to an embodiment of the invention, said door element is hinged at the front edge thereof with respect to the construction machine and is closed by abutting with its rear edge against an abutment portion of said arrangement. According to the above embodiment, the door is swingably arranged such that the operator's cab can be opened by swinging the door from a closed position to an open position about said hinges which are provided at the front side of the operator's cab. In this context, the front side relates to the front side of the construction machine, i.e. the forward movement's direction thereof.

According to an embodiment of the invention, said arrangement has a longitudinal axis which is aligned to a longitudinal symmetry axis of said construction machine, wherein in a closed state said rear edge of said door element is closer to said longitudinal axis than said front edge thereof. According to this embodiment, the door is inclined when closed with respect to the longitudinal axis of the construction machine.

According to an embodiment of the invention, in an open state said rear edge of said door element is displaced from said abutment portion by an extent which allows access to said operator's cab. Opening said door element is achieved by swinging the door from the closed state in which the main area thereof is inclined towards the central axis of the construction machine at the rear side thereof away from the abutment portion such said an opening providing access to the operator's cab is provided. In this course of opening the door element, the inclination angle of the door element in relation to the central axis of the construction machine is decreased, and optionally, the rear edge of the door element is positioned further spaced from the central axis than the front edge of the door element when the door element is completely open.

According to an embodiment of the invention, said abutment portion is located closer to said longitudinal axis than a side wall element located on the side opposite to said door element in relation to said longitudinal axis. According to the above embodiment, the inner space is optimally used due to the fact that at the side where no door is provided, the above defined inclination applying to the door element when closed is not provided.

According to an embodiment of the invention, a tread is provided in the area below said door element and adjacent to an opening formed in said side wall element in the opened position of said door element. The tread can be provided below the area which is swept over by the door element when moved for opening or closing the same. In a closed position of the door element, the tread is positioned offset in a lateral direction of the main area of the door element. When the door is opened, the tread is positioned between the inner area of said door element facing towards the inner space of the operator's cab and the opening provided for accessing the operator's cab. Based on such an arrangement, the operator can easily and safely walk on the tread when the door is opened, enter the inner space of the operator's cab and close the door. Due to this construction, the operator is not forced to step on elements of the construction machine which are not designated for stepping, such as top sides of the tracks. Based on this arrangement, the safety requirements are fulfilled and, at the same time, dust and dirt is inhibited from entering the inner space of the operator's cab.

According to an embodiment of the invention, said operator's cab arrangement comprises at least four posts which are arranged upright with respect to said construction machine wherein said wall elements are respectively arranged between two adjacent of said posts. Such an arrangement provides a rigid support in particular for the application in construction machines in which the requirements for stability are rather high.

According to an embodiment of the invention, the posts comprise a pair of front posts which can be arranged symmetrically with respect to said longitudinal axis of said arrangement and a pair of rear posts which are preferably arranged asymmetrically with respect to said longitudinal axis of said arrangement. The use of the above defined asymmetrical arrangement of the rear posts provides the inclination of the main area of the door element in a closed position due to the fact that the front post to which the door element is hingedly connected is offset in the lateral direction with respect to the rear post to which the abutment portion is connected.

According to an embodiment of the invention, one of said rear posts which provides said abutment portion is located closer to said longitudinal axis than the other rear post located on the opposite side in relation to said longitudinal axis. With this arrangement, the inner space of the operator's cab arrangement is optimally used as there is no need to provide a symmetric arrangement with regard to the rear post. Consequently, the space on the side opposite to the door opening is increased.

According to an embodiment of the invention, said front posts are arranged at the same distance from the longitudinal axis of said arrangement. Due to the above arrangement, the field of view for the operator towards the front area of the construction machine is optimized as e.g. a window is placed between the pair of front posts which should be increased in surface area as much as possible.

According to a further aspect of the invention, a construction machine is provided which has at least a pair of tracks which are drivable by a drive means, the construction machine further comprising an operator's cab arrangement according to one of the above described embodiments.

According to an embodiment of the invention, in the construction machine said tread is provided above one of said tracks for providing a walk passage for the access to said operator's cab with the door element being opened. Based on this construction, it is possible to access the operator's cab without stepping on elements of the construction machine which are not designated or adapted for walking with the advantages discussed above.

According to an embodiment, in the construction machine said front wall element includes a window element which is symmetrical with respect to said longitudinal axis of said construction machine. With the above arrangement, the surface area of the window element can be increased in order to optimize the field of view for the operator to the forward direction of the construction machine.

According to an embodiment of the invention, in the construction machine said rear wall element is asymmetrical with respect to said longitudinal axis of said construction machine by providing said rear post located at the side of said door element closer to said longitudinal axis of said construction machine than the other offset rear posts. Based on the above construction, the inclination of the door element in the closed position is achieved with the advantages of providing a walkway based on the tread when the door element is open being achieved as discussed above.

According to an embodiment of the invention, in the construction machine one or multiple steps are provided at a rear part of said construction machine leading to said tread which is provided above one of said tracks of said construction machine. The provision of steps as defined above further improves the accessibility of the operator's cab without the requirement to step on elements of the construction machine which are not designated for walking. With a construction machine having the above features, the safety requirements for entering the operator's cab are advantageously met, while, at the same time, the intrusion of dust and dirt, due to walking on dirty elements of the construction machine, can be avoided as much as possible.

It is noted that the above embodiments can be applied as single measure or in combination. In any case, the construction machine defined as application for the inventive concept provides the best result when said construction machine is a dozer having the pair of tracks and at least one blade arranged for performing earth moving operations, wherein the blade is operatively linked to a main body of the construction machine.

BRIEF DESCRIPTION OF THE DRAWINGS

The invention is explained based on the enclosed drawings showing an exemplary operator's cab arrangement applied to a construction machine according to embodiments and modifications. It is noted that the following drawings should not be considered as limiting the invention set out in the claims. Moreover, the illustrated construction machine is merely an example and the operator's cab arrangement according to the invention is applicable to various types of construction machines.

DETAILED DESCRIPTION OF THE EMBODIMENTS

In the following, embodiments of the present invention are explained in detail based on the drawings. It is noted that the below explained embodiments, in particular the application of the operator's cab to the specific construction machine, are not limiting the invention and rather intended to clarify the basic concept thereof.

Figure 1:
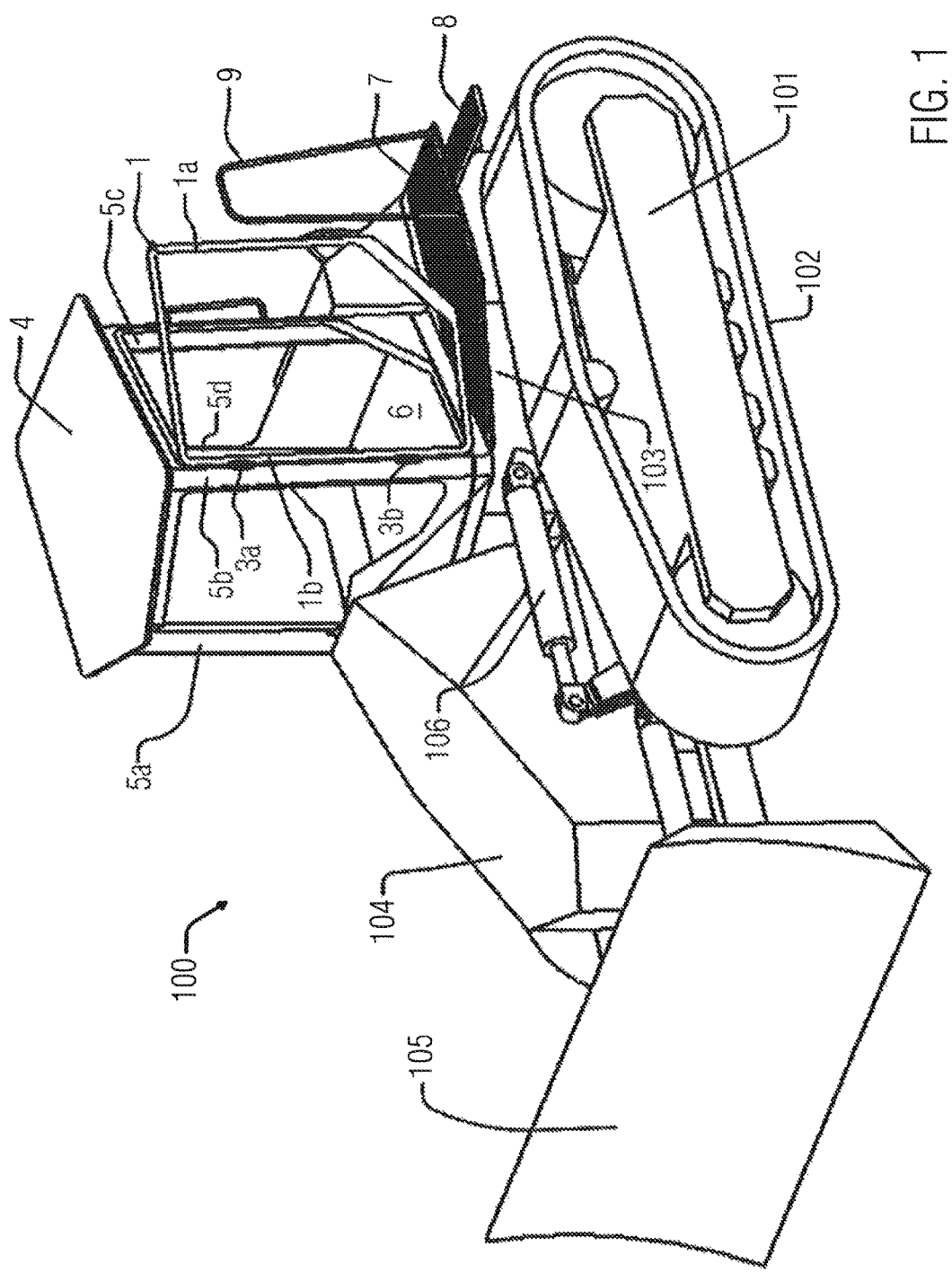
FIG. 1 illustrates the basic outline of a construction machine to which the operator's cab according to the invention is applied.
Figure 2:
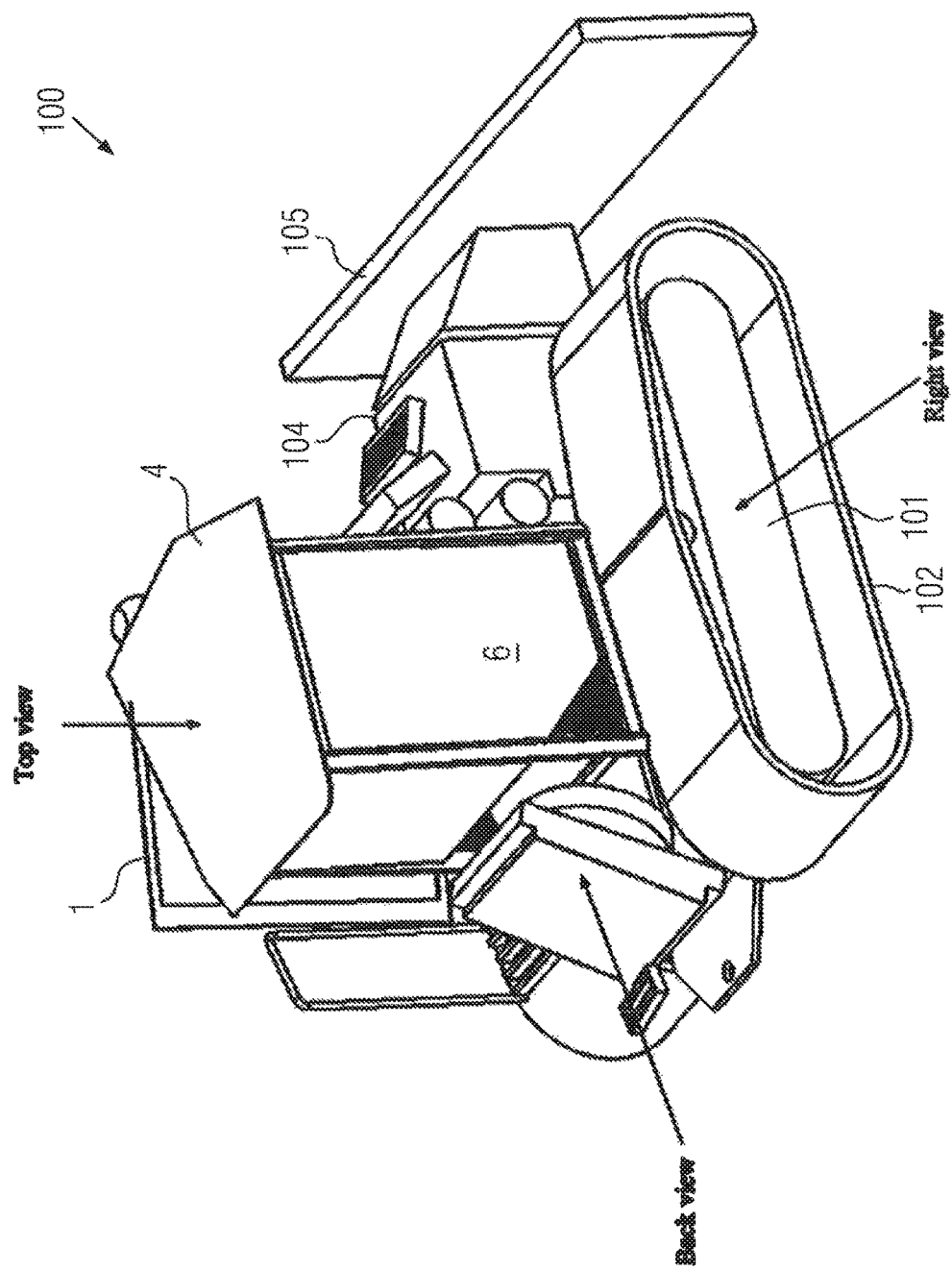
FIG. 2 illustrates a construction machine with the operator's cab according to the invention for indicating directions.

The specific application of the operator's cab according to an embodiment is shown in the drawings. FIG. 1 illustrates the basic outline of a construction machine to which the operator's cab according to the invention is applied. FIGS. 2 and 6-12 show the construction machine in various views. In the following, the specific construction of the construction machine is explained.

As can be seen in the drawings, the construction machine 100 is embodied as Bulldozer having a pair of tracks 102 on the left and right side. Each of the tracks 102 is supported by a track support arrangement 101 which includes a number of wheels for guiding and/or driving the track in a known manner. Each track 102 is driven by at least one of the wheels provided in the track support arrangement 101 such that the track 102 which is formed as endless chain is moved in a known manner. Each of the tracks 102 can be driven in a forward or rearward direction such that a driver's seat as well as the direction of movement of the construction machine is controllable.

In the front part of the construction machine 100, an engine compartment 104 is provided. Within the engine compartment 104, an engine can be provided as well as further equipment such as generators, hydraulic pumps and the like. The arrangement of the engine compartment and the equipment provided therein is not essential to the present invention.

In the front section of the construction machine 100 a blade 105 is arranged in order to perform the intended earth moving work. For this reason, the blade 105 is mounted to the construction machine 100 in a manner such that the blade 105 can be lifted and lowered. This is achieved by actuators 106 which can be embodied as hydraulic actuators. It is mentioned that the type of actuators and the construction of the blade 105 is not essential to the invention. However, it is crucial that the operator operating the construction machine has optimum view to the area where the blade 105 effects the earth moving application.

The construction machine 100 further comprises a main body 103 which supports the track support arrangements 101 as well as the blade 105 together with the actuators 106.

As can be seen in FIG. 1, the operator's cab according to the present invention is provided on top of the main body 103 of the construction machine 100. The operator's cab is explained in detail as follows. The construction of the operator's cab applied to the construction machine 100 of FIG. 1 is shown in FIGS. 3 to 5, 13 and 14.

Figure 3:
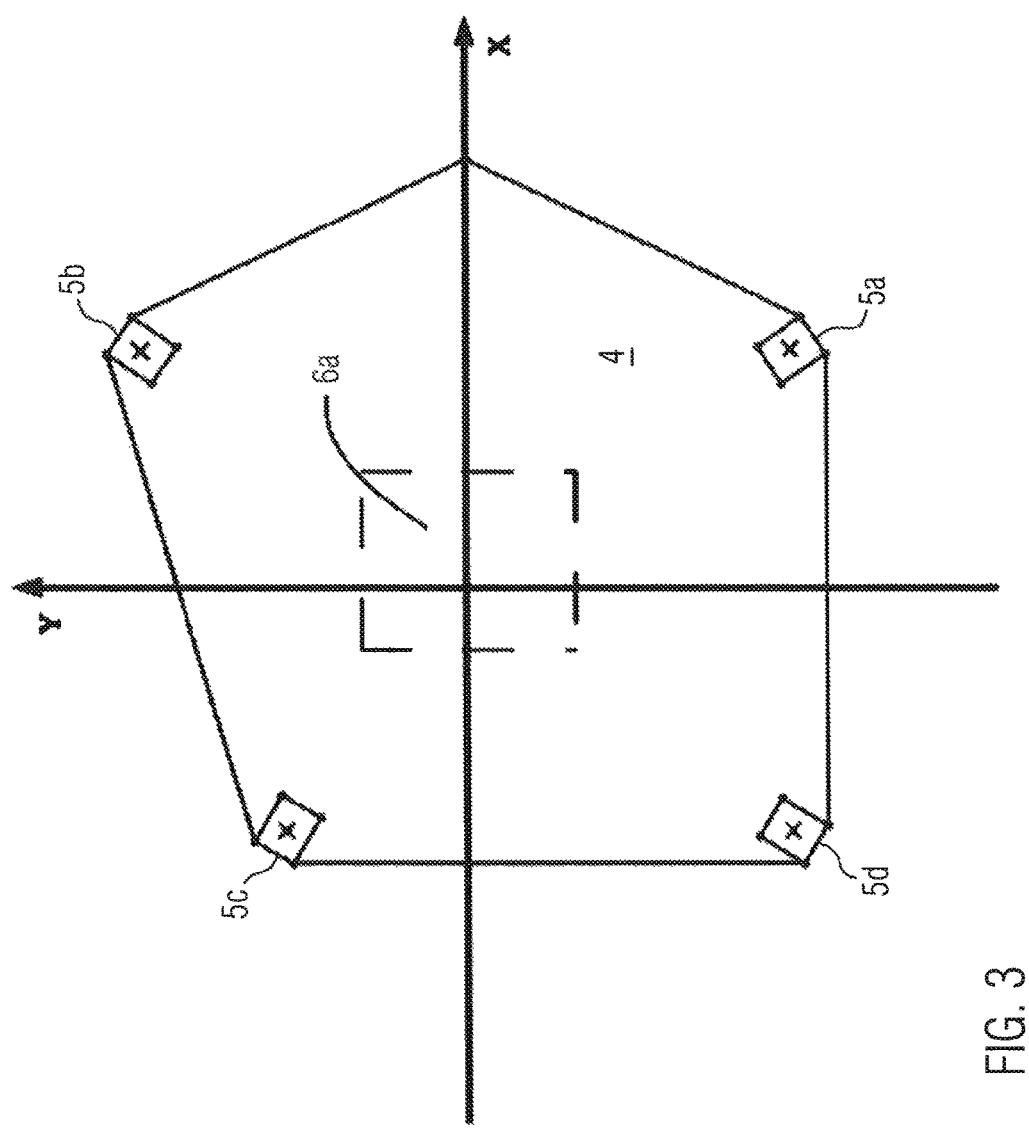
FIG. 3 is a schematic top view of the operator's cab.

As shown in FIG. 3, four posts are provided at corners of the operator's cab. The posts include a post 5a at the front right, a post 5b at the front left, a post 5c at the rear left and a post 5d at the rear right. In this context, the front direction is defined as direction in which the construction machine, in the present case, the bulldozer, is driven in order to apply the blade 105 in a known manner.

The four posts 5a to 5d are erected substantially upright from a floor element 6 which forms the floor of the operator's cab. On top of the posts 5a to 5d, a roof element 4 is provided. Between the post 5a at the front right and the post 5b at the front left, a window or wind shield is arranged. Between the post 5a at the front right and the post 5d at the rear right, a wall element is arranged. Similarly, between the post 5c at the rear left and the post 5d at the rear right, a wall element is provided as well.

In the present embodiment shown in FIG. 1, a door element 1 is arranged on the left side, in particular, between the post 5b and the front left and the post 5c at the rear left. The specific arrangement of the door is explained in more detail below.

As can be seen in FIG. 1, for example, at the same side where the door element 1 is provided, a tread 7 is arranged which is mounted to the main body 103 of the construction machine or at least supported on the same. At the tread 7, a hand rail 9 is provided. In the present embodiment, the hand rail is arranged at the lateral side, i.e. offset away from the operator's cab. In addition, a step 8 is shown which is supported at the main body 103 of the construction machine. It is noted that multiple steps can be provided depending on the need.

FIG. 3 shows a schematic illustration of the operator's cab according to the invention in a cross section. In this view, the arrow indicated by letter x is the longitudinal direction of the construction machine facing in the forward direction. In addition, this arrow x indicates an axis of symmetry of the construction machine 100. The arrow indicated with the letter y indicates the lateral direction which arrow points from the right side to the left side of the construction machine 100 when viewed from the top side. In this view, the four posts 5a, 5b, 5c and 5d are shown. According to the concept of the present invention, the posts 5a and 5b are positioned at the front side of the operator's cab in relation to the posts 5c and 5d which are positioned in the rear side of the operator's cab. As can be derived from the illustration of FIG. 3, the front posts 5a and 5b are situated symmetrically with respect to the axis of symmetry indicated by the arrow x. In particular, the distance of the posts 5a and 5b in the lateral direction in relation to the axis of symmetry as well as the distance between the posts 5a and 5b with respect to the lateral axis indicated by arrow y are substantially identical.

While the distance of the rear posts 5c and 5d with respect to the lateral direction indicated by arrow y are the same, the post 5c at the rear left side is substantially closer to the axis of symmetry indicated by arrow x than the post 5d at the rear right side. Preferably, the distance between post 5c and the axis of symmetry can be 80% of the distance between post 5d and the axis of symmetry indicated as arrow x. More preferably, the distance between post 5c and the axis of symmetry can be 60% or even 40% of the distance between post 5d and the axis of symmetry indicated as arrow x.

While a windshield or window is arranged between posts 5a and 5b and wall elements are provided between posts 5a and 5d as well as between posts 5d and 5c, a door opening is provided between posts 5b and 5c.

As can be derived from FIG. 3, the virtual plane between the post 5b at the front left side and the post 5c at the rear left side is inclined towards the axis of symmetry indicated by arrow x. This concept is explained below in greater detail.

Figure 4:
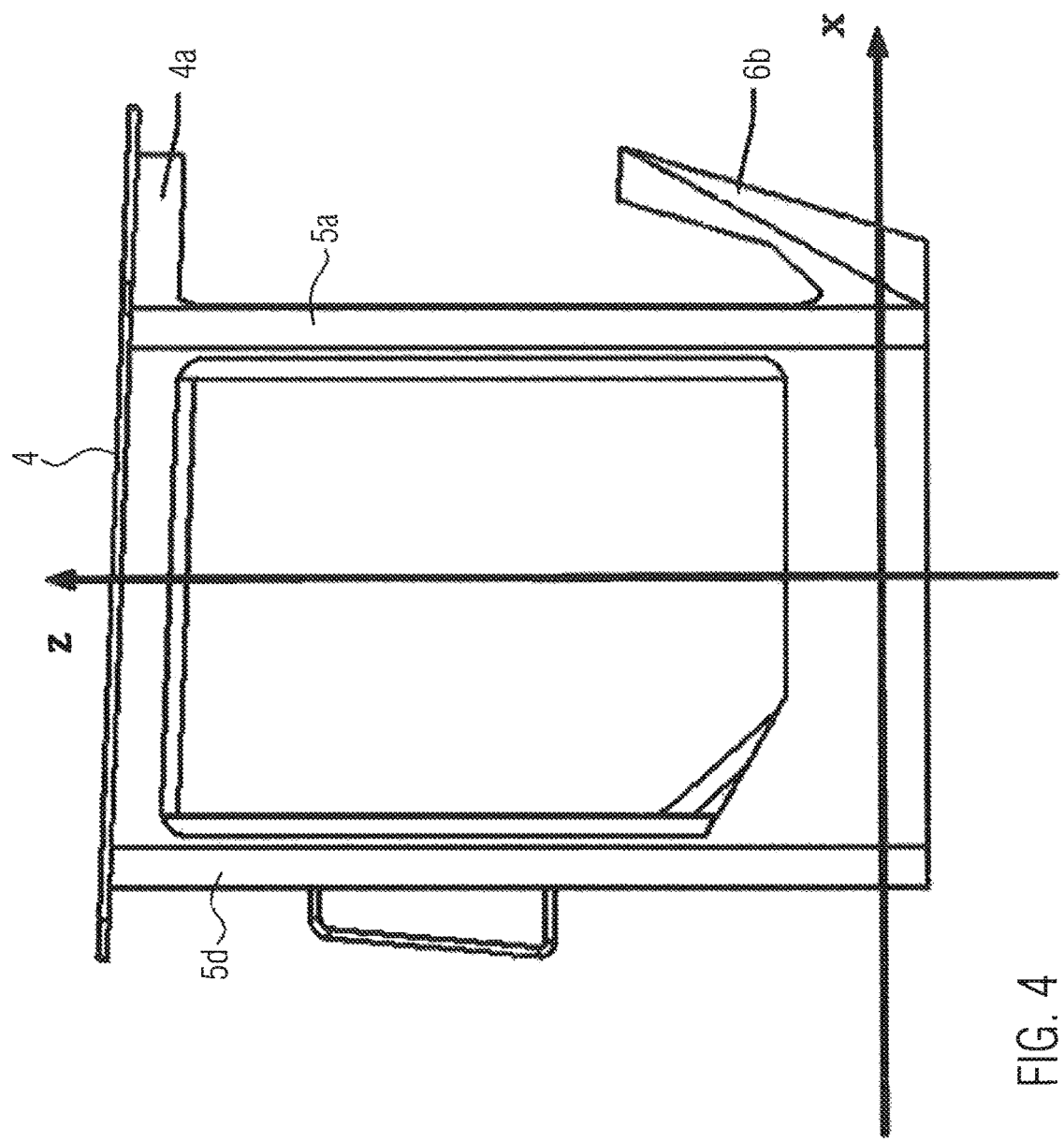
FIG. 4 is a side view of the operator's cab from the right side.

As can be seen in FIG. 4, a frame member 6b is arranged in front of the posts 5a and 5b at the front side of the operator's cab. Moreover, a roof extension 4a is provided at the top area forming an extension of the roof element 4. The windshield or window provided at the front side of the operator's cab can be formed with a protruding shape, in particular, with an arrow shape and mounted to the roof extension 4a, the posts 5a and 5b at the front side and the frame member 5b. According to this specific arrangement, the roof extension 4a and the frame member 6b form reinforcement or mounting members for the windshield.

Figure 5:
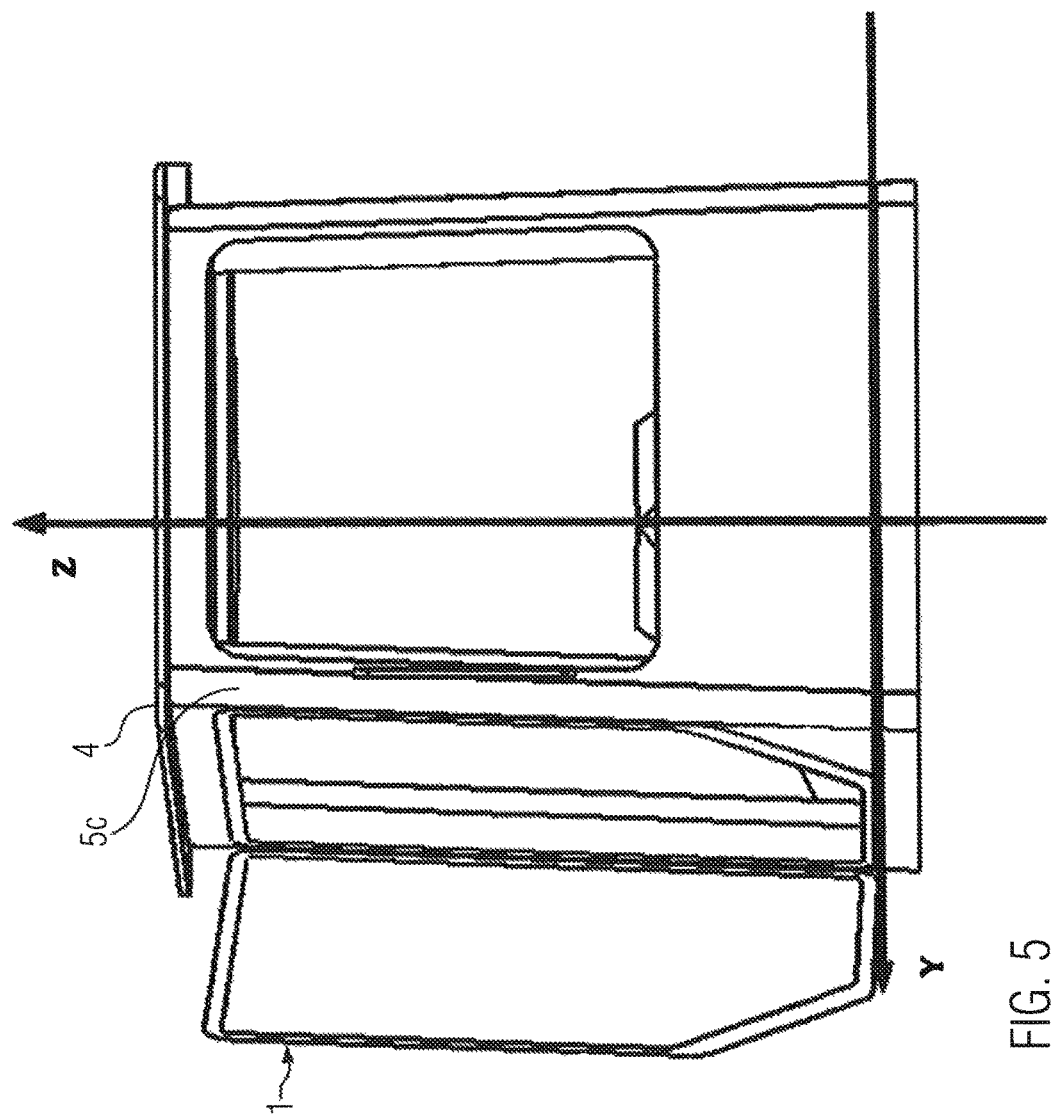
FIG. 5 is a view of the operator's cab from a back side.
Figure 6:
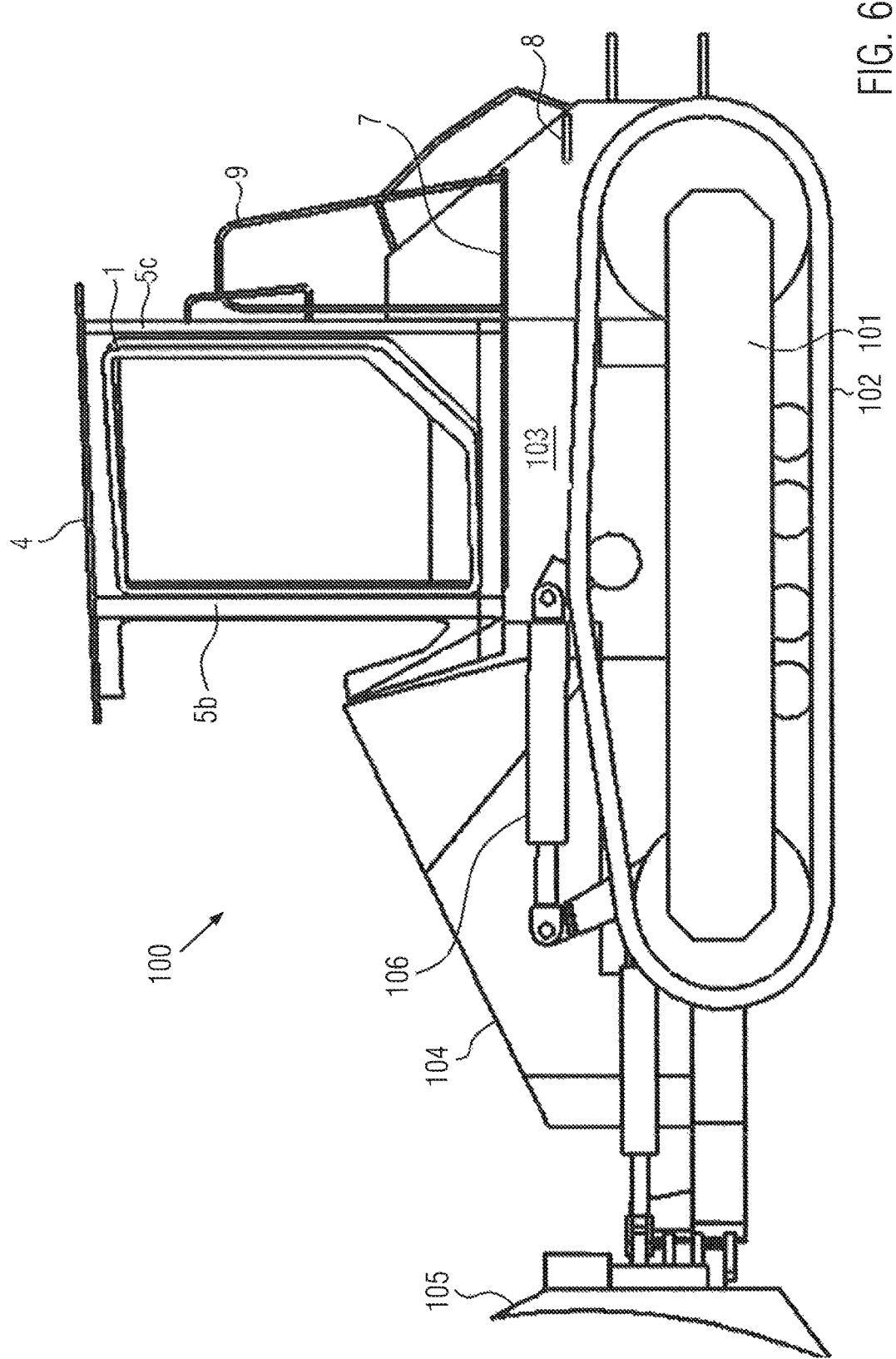
FIG. 6 illustrates a construction machine to which the operator's cab is applied from the left side.
Figure 7:
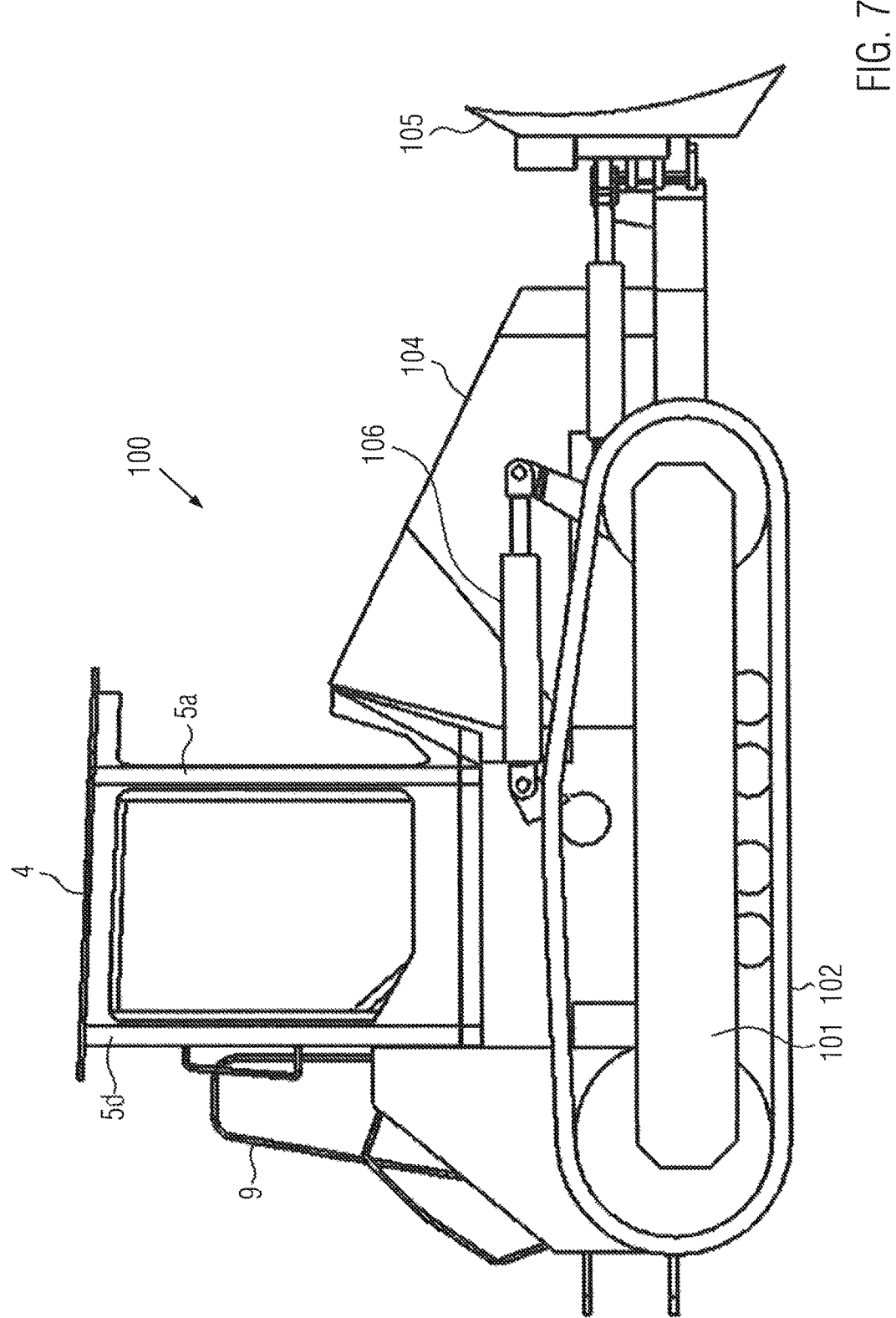
FIG. 7 illustrates a construction machine to which the operator's cab is applied from the right side.
Figure 8:
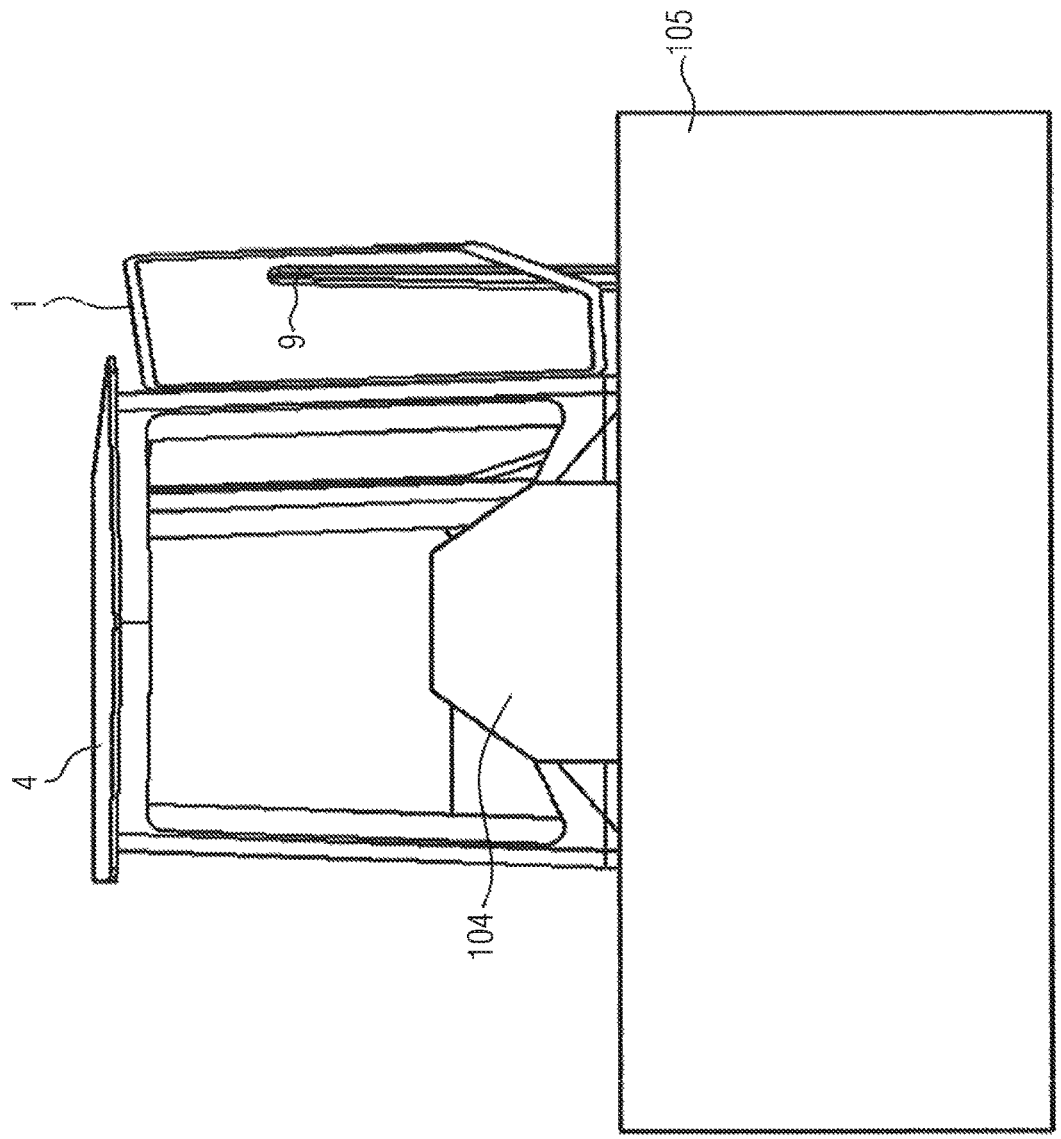
FIG. 8 illustrates a construction machine to which the operator's cab is applied from a front side.

As can be seen in FIG. 5, the door element 1 is mounted in the area of the front left post 5c and shown in an open condition in FIG. 5. With reference to FIG. 1, the door element 1 is hingedly mounted to the post 5b at the front left side by hinges 3a and 3b such that the door element 1 is pivotably connected to the post 5b at the front left side. The shape of the door element 1 is adapted to the door opening which is provided between the post 5b at the front left side and the post 5c at the rear left side. A pivoting axis about which the door is hingedly mounted to the post 5b at the front left side is substantially upright. However, in specific applications, a deviation from the upright direction which is indicated by the arrow z in FIG. 5 can be considered without departing from the scope of the present invention.

Figure 9:
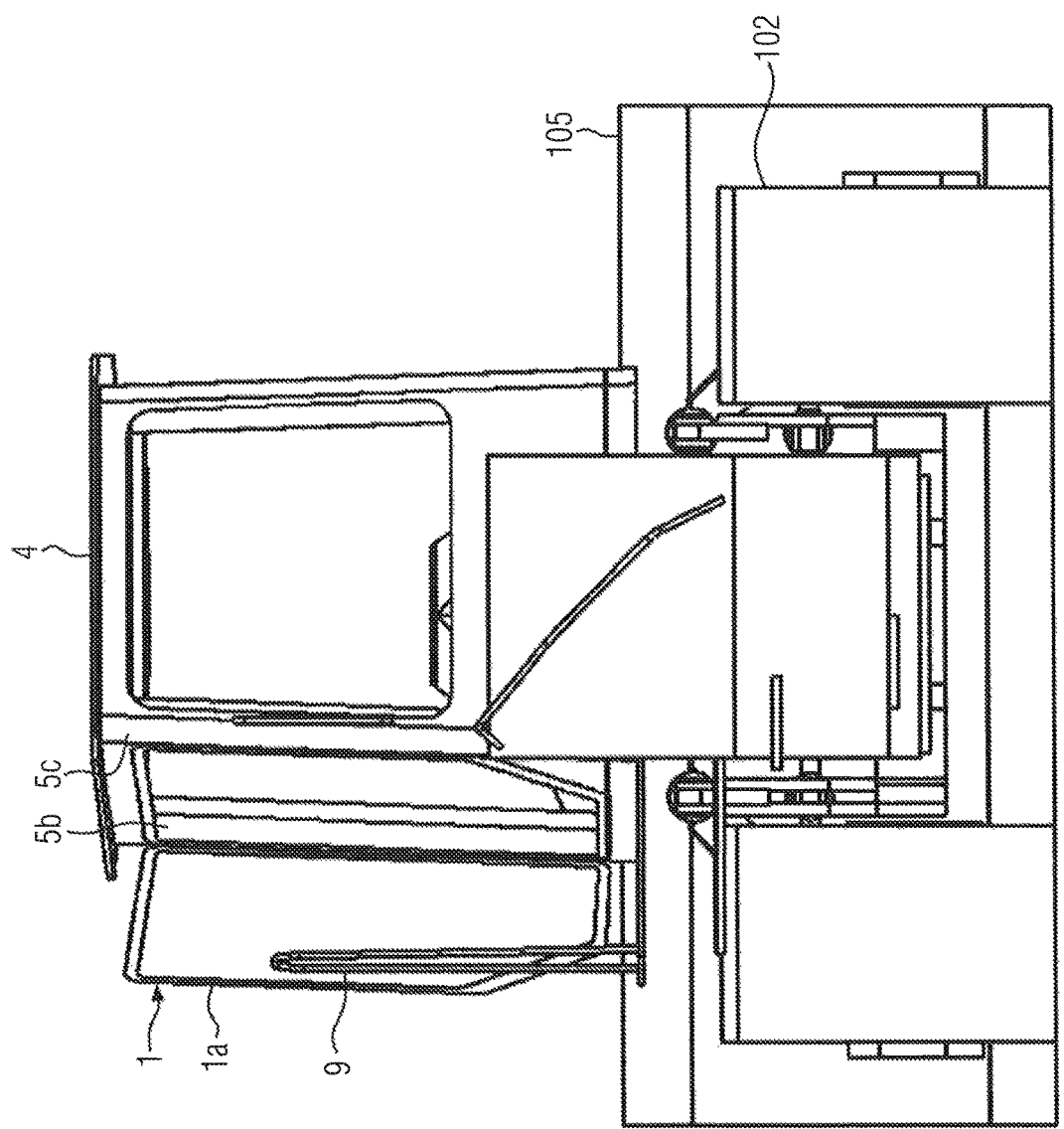
FIG. 9 illustrates a construction machine to which the operator's cab is applied from a rear side.

With reference to FIG. 9, the concept of the asymmetric arrangement of elements on the left side of the operator's cab is explained. FIG. 9 shows the door element 1 in an opened condition. In this situation, the door opening provides access to the inner space of the operator's cab arrangement. In particular, a virtual plane including the door opening is inclined towards the access of symmetry at the back side such that the access through the door opening is simplified.

Figure 10:
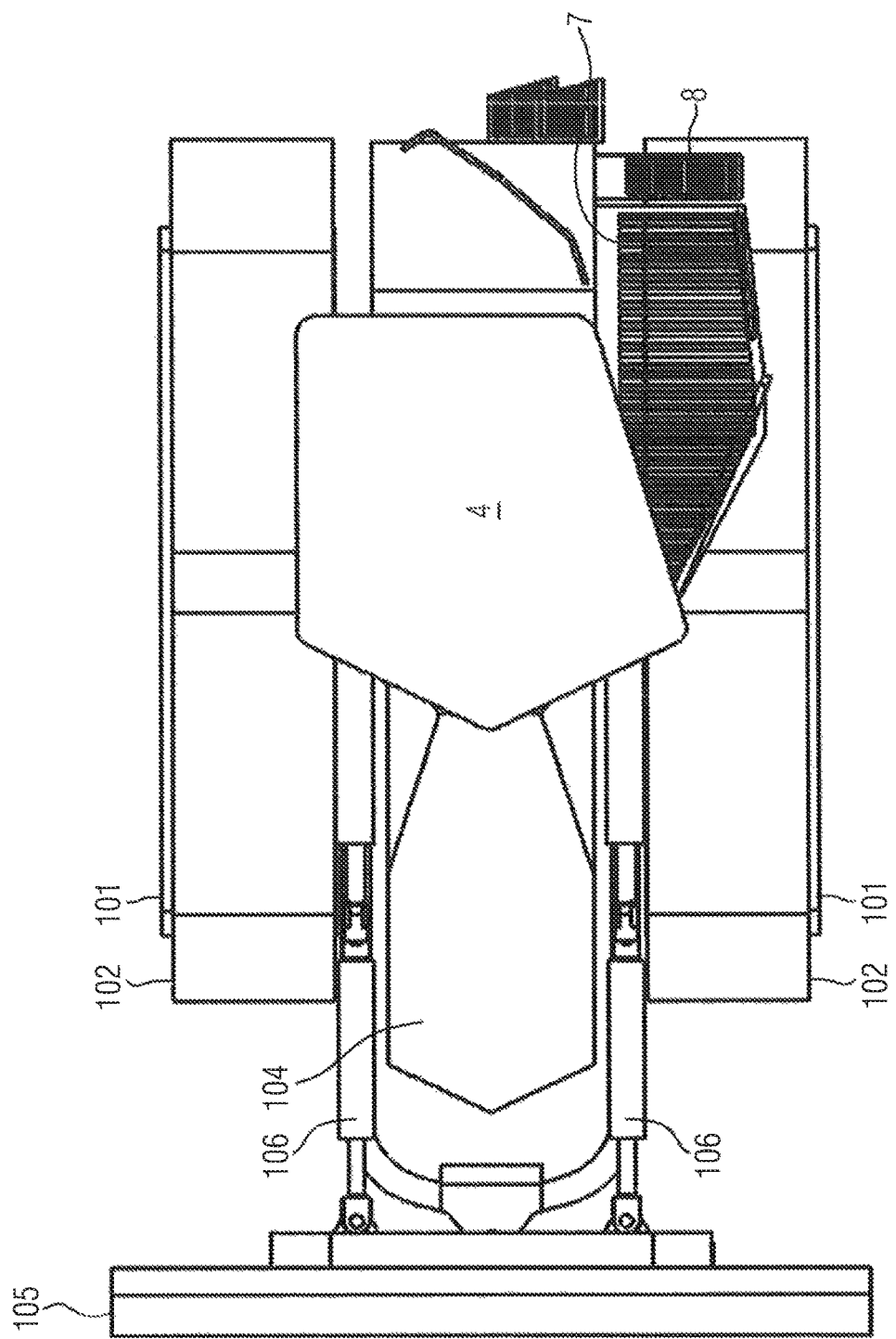
FIG. 10 to illustrates a construction machine to which the operator's cab is applied from a top side.
Figure 11:
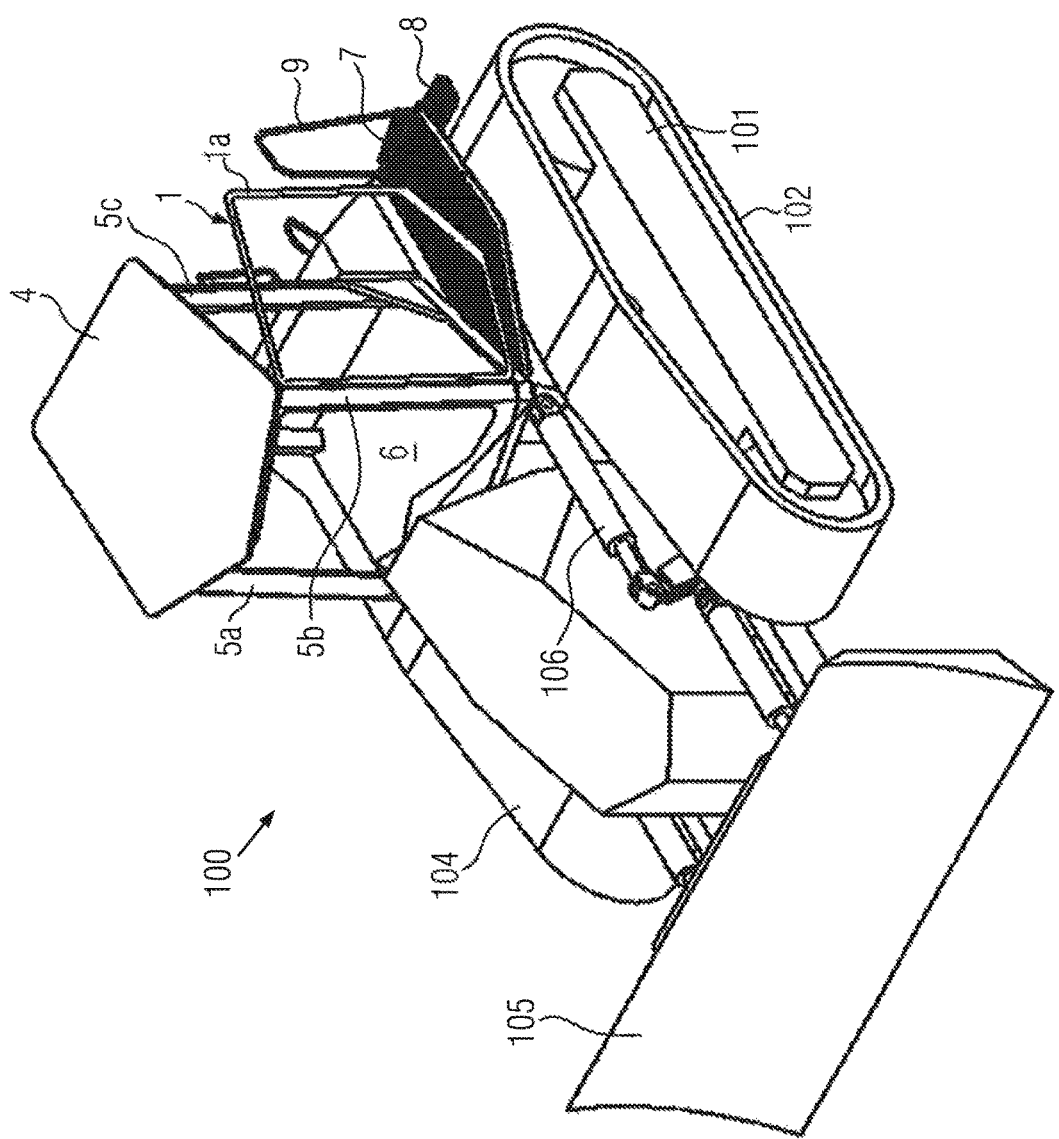
FIG. 11 shows a construction machine to which the operator's cab is applied in an elevation view.
Figure 12:
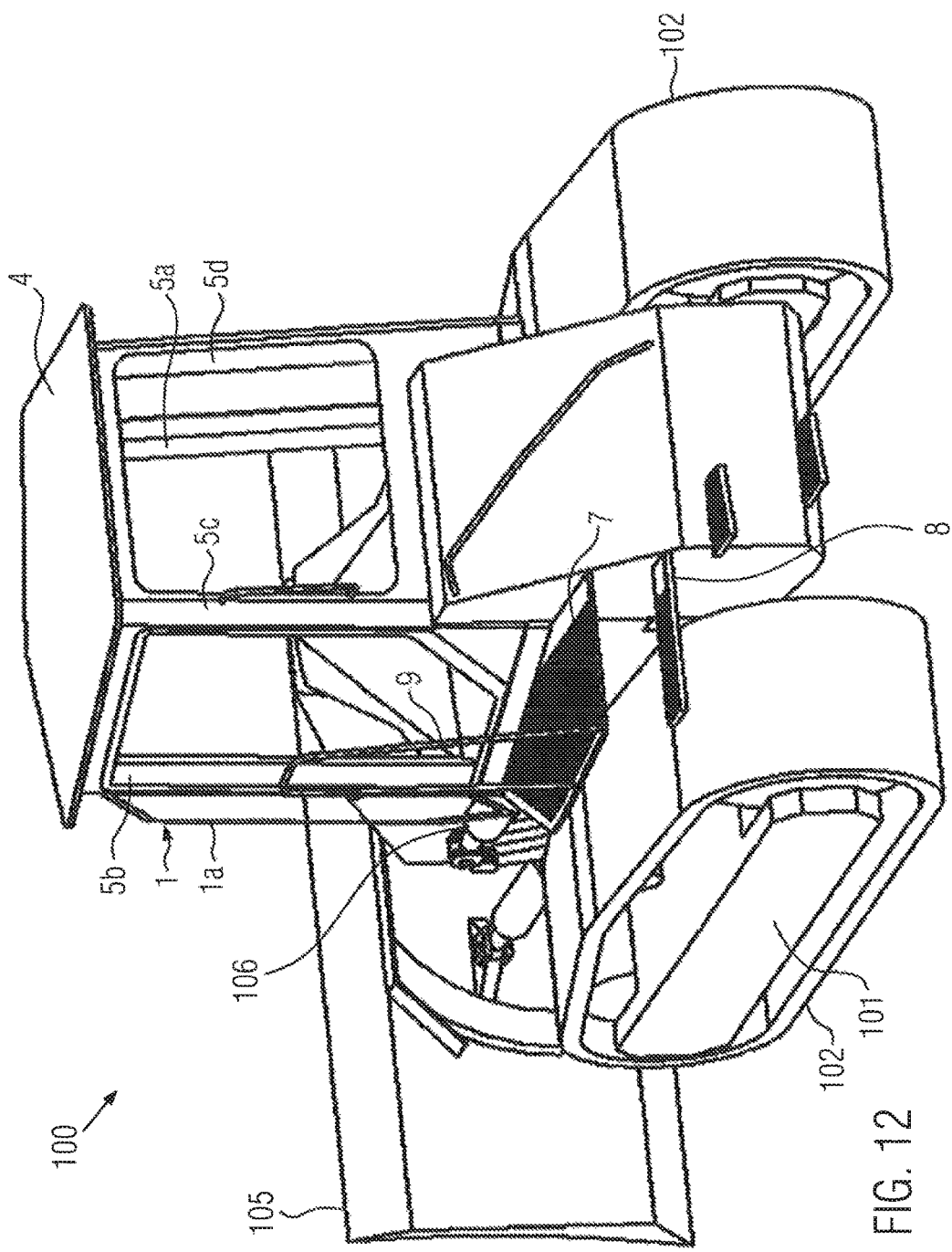
FIG. 12 illustrates a construction machine to which the operator's cab is applied from a rear left direction.

With reference to FIG. 10, the tread 7 is arranged such that the door element 1, when open, sweeps over a part of the surface of the tread 7. Therefore, if the door element 1 is opened, the tread 7 can be stepped on and the operator can enter through the door opening without stepping on elements of the construction machine 100 which are not designated to be stepped on, such as the upper sides of the tracks 102. As can be derived from the top view of FIG. 10, the dimension of the front area of the operator's cab is larger than at the back side. Consequently, a synergistic effect is provided by the asymmetric arrangement such that the field of the view through the front side of the operator's cab is optimized while at the back side, where the field of view is of minor importance is reduced, whereas at the same time the asymmetry is used to allow the provision of a tread 7 which can be used for entering the operator's cab when the door is open.

Figure 13:
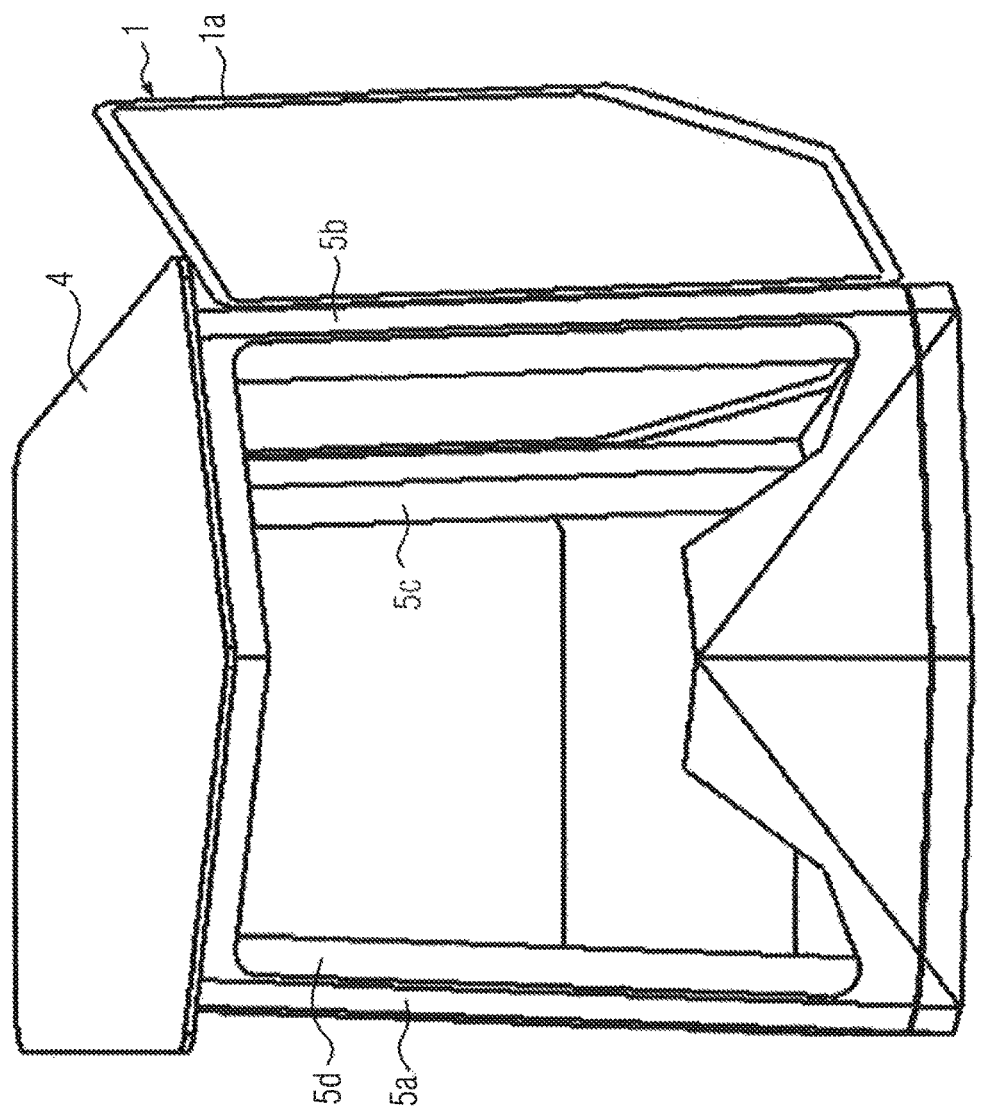
FIG. 13 illustrates the operator's cab arrangement from a front side.
Figure 14:
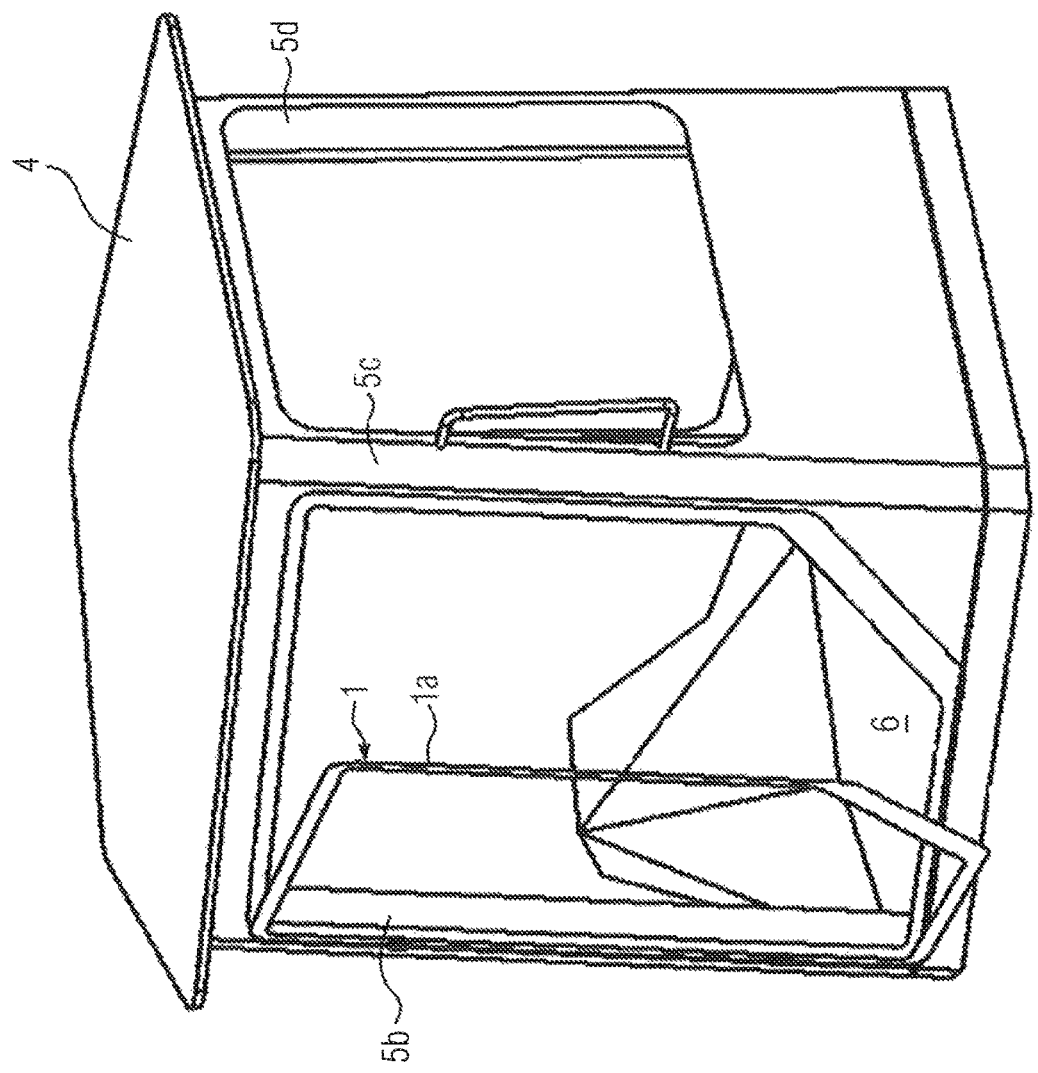
FIG. 14 illustrates the operator's cab arrangement from a left side.

FIGS. 13 and 14 show the operator's cab as a separate element. It is noted that the application of the above concept to the construction machine shown in the drawings, does not restrict the invention and rather, the concept according to the invention refers to the asymmetric design of the operator's cab discussed above.

Moreover, in the present example, the door element 1 is discussed as being arranged on the left side. Obviously, the door arrangement can be provided at the right side as long as the above discussed effect is achieved. In addition, the specific construction of the above elements such as the posts, the roof element, the floor element and the like are not essential to the invention defined in the claims.

The invention claimed is:

1. A construction machine, comprising an operator's cab arrangement for a construction machine, the arrangement comprising:

side wall elements, a front wall element, a rear wall element and a roof element, wherein at least one of said side wall elements is closable by a door element which is pivotably mounted to said arrangement with a pivot axis being substantially vertical with respect to said construction machine, wherein said door element is inclined towards a central axis of said construction machine when closed, the central axis being an axis of symmetry of the construction machine and defined as a longitudinal axis which is substantially aligned to a movement direction of the construction machine when the same is moved straight forward, wherein said front wall element is symmetrical and said rear wall element is asymmetrical with respect to said longitudinal axis, wherein said door element is hinged at a front edge thereof with respect to the construction machine, the door element being configured and arranged to be closed by abutting with a rear edge thereof against an abutment portion of said arrangement, wherein, in a closed state, a distance between said rear edge of said door element and said longitudinal axis is less than a distance between said front edge of said door element and said longitudinal axis, and wherein in an open state said rear edge of said door element is displaced from said abutment portion by an extent which allows access to an operator's cab, and wherein one or multiple steps are supported by a rear portion of said construction machine and lead to said door element.

2. The construction machine according to claim 1, wherein said abutment portion is located closer to said at least one side wall element closable by said door element than to a side wall element located on an opposite side of said door element with respect to said longitudinal axis.

3. The construction machine according to claim 2, wherein said abutment portion is located closer to said longitudinal axis than to said side wall element located on said opposite side to said door element with respect to said longitudinal axis.

4. The construction machine according to claim 1, wherein a tread is provided in an area below said door element and adjacent to an opening formed in said at least one side wall element closable by said door element in an opened position of said door element.

5. The construction machine according to claim 4, further comprising a pair of tracks configured and arranged to be drivable by a drive means.

6. The construction machine according to claim 5, wherein said tread is provided above one track of said pair of tracks, and is configured and arranged for providing access to said operator's cab with the door element being opened.

7. The construction machine according to claim 6, wherein said front wall element of said cab arrangement includes a window element symmetrical with respect to said longitudinal axis of said construction machine.

8. The construction machine according to claim 6, wherein the one or multiple steps are positioned at said rear portion of said construction machine proximate to said tread.

9. The construction machine according to claim 5, wherein said front wall element of said cab arrangement includes a window element which is symmetrical with respect to said longitudinal axis of said construction machine.

10. The construction machine according to claim 9, further comprising:
a pair of rear posts, each post of said pair of rear posts positioned at a side of said door element,
wherein, the asymmetry of the rear wall element is provided by positioning one of said rear posts at a side of said door element closer to said longitudinal axis of said construction machine than the other of said rear posts is positioned relative to said longitudinal axis.

11. The construction machine according to claim 5, further comprising:
a pair of rear posts, each post of said rear posts positioned at a side of said door element,
wherein the asymmetry of the rear wall element is provided by positioning one of said rear posts at a side of said door element closer to said longitudinal axis of said construction machine than the other of said rear posts is positioned relative to said longitudinal axis.

12. The construction machine according to claim 5, wherein the one or multiple steps are positioned at said rear portion of said construction machine proximate to said tread, the tread being positioned above one track of said pair of tracks of said construction machine.

13. The construction machine according to claim 5, wherein said construction machine is a dozer having said pair of tracks and at least one blade configured and arranged for performing earth moving operations, said at least one blade being operatively coupled to a main body of said construction machine.

14. The construction machine according to claim 1, wherein said arrangement comprises at least four posts arranged upright with respect to said construction machine, wherein at least one of said front wall element, rear wall element, and side wall elements is arranged between two adjacent posts of said at least four posts.

15. The construction machine according to claim 14, wherein said posts comprise a pair of front posts arranged symmetrically with respect to said longitudinal axis of said arrangement, and a pair of rear posts arranged asymmetrical with respect to said longitudinal axis of said arrangement.

16. The construction machine according to claim 15, wherein a distance between one of said pair of rear posts providing said abutment portion and said longitudinal axis is less than a distance between the other of said pair of rear posts located on an opposite side with respect to said longitudinal axis and said longitudinal axis.

17. The construction machine according to claim 15, wherein said pair of front posts are arranged equidistant from the longitudinal axis of said arrangement.

* * * * *